United States Patent
Wang et al.

(10) Patent No.: US 8,547,049 B2
(45) Date of Patent: Oct. 1, 2013

(54) DC MOTOR ASSEMBLY WITH STEP ADJUSTING CONTROL ARRANGEMENT

(76) Inventors: Xin Wang, Fujian (CN); Jiangqun Chen, Fujian (CN)

( * ) Notice: Subject to any disclaimer, the term of this patent is extended or adjusted under 35 U.S.C. 154(b) by 452 days.

(21) Appl. No.: 12/807,666

(22) Filed: Sep. 10, 2010

(65) Prior Publication Data
US 2011/0286723 A1  Nov. 24, 2011

(30) Foreign Application Priority Data
May 18, 2010  (CN) .......................... 2010 2 0193872

(51) Int. Cl.
*H02P 8/00*  (2006.01)

(52) U.S. Cl.
USPC ................... 318/696; 318/400.14; 318/400.4; 318/721; 318/799; 318/640

(58) Field of Classification Search
USPC ................ 318/400.01, 400.4, 605, 661, 685, 318/696, 400.39, 280, 721, 400.14, 400.07, 318/400.16, 560, 568.18, 599, 640; 351/234; 356/3.16, 5.06, 45; 359/528; 396/168, 236
See application file for complete search history.

(56) References Cited

U.S. PATENT DOCUMENTS

| | | | | |
|---|---|---|---|---|
| 4,015,701 A | * | 4/1977 | Templeton | .................... 400/611 |
| 4,042,863 A | * | 8/1977 | von der Heide | ......... 318/400.01 |
| 4,169,990 A | * | 10/1979 | Lerdman | .................. 318/400.41 |
| 5,012,169 A | * | 4/1991 | Ono et al. | ................ 318/568.22 |
| 5,953,545 A | * | 9/1999 | Nomura et al. | ............... 396/168 |

* cited by examiner

*Primary Examiner* — Antony M Paul
(74) *Attorney, Agent, or Firm* — Raymond Y. Chan; David and Raymond Patent Firm

(57) ABSTRACT

A DC motor assembly includes a motorized unit for generating a rotatable power at an output shaft, and a step adjusting control arrangement including an optical grating and a photocoupler. The optical grating, which is operatively coupled at the output shaft, has a plurality of light transmissible portions and a plurality of light blocking portions alternating with the light transmissible portions. The photocoupler is activated to send out an impulse signal in responsive to a phase shift between the light transmissible portion and the light blocking portion of the optical grating, wherein the output shaft is controllably driven to be rotated and stopped in a sequent manner as a stepping movement thereof in responsive to the impulse signal so as to controllably adjust the rotational speed of the output shaft.

6 Claims, 5 Drawing Sheets

DC MOTOR ASSEMBLY WITH STEP ADJUSTING CONTROL ARRANGEMENT

BACKGROUND OF THE PRESENT INVENTION

1. Field of Invention

The present invention relates to an electric motor, and more particularly to a DC motor assembly with step adjusting control arrangement especially for a container, which is adapted to adjustably control the rotational speed of the output shaft of the DC motor in a stepping manner.

2. Description of Related Arts

A conventional DC motor generally comprises an output shaft for generating a rotatable power. In order to control the rotational speed of the output shaft, the DC motor has two terminals being electrically connected with a power source. When the output voltage of the power source is increased, the rotational speed of the output shaft is correspondingly increased. Likewise, when the output voltage of the power source is reduced, the rotational speed of the output shaft is correspondingly decreased. On the other hand, a load at the output shaft will also change the rotatable power thereof. When the load is increased, the rotational speed of the output shaft is correspondingly decreased. When the load is reduced, the rotational speed of the output shaft is correspondingly increased. In order to provide a stable rotatable power of the output shaft, the DC motor further comprises a feedback control to control the rotational speed of the output shaft. Accordingly, when the rotational speed of the output shaft is determined below a predetermined threshold, the feedback control will send a feedback signal to the DC motor for increasing the output voltage so as to adjustably increase the rotational speed of the output shaft. In other words, the rotatable power generated from the DC motor will be selectively adjusted in responsive to the feedback signal in order to provide a stable rotational speed of the output shaft. However, the feedback control has a major drawback that the feedback control cannot control the angular phase shift of the output shaft that the output shaft can be stopped at a desired angular position and cannot adjust the step rotational speed of the output shaft. In addition, the domestic electrical appliance is cost ineffective when the domestic electrical appliance incorporates with the motor having the feedback control because the motor will substantially increase the manufacturing cost of the domestic electrical appliance.

Accordingly, the step motor, or named stepper motor, is an electric motor that can divide a full rotation into a large number of steps, wherein the output shaft can be controlled precisely at its angular position. However, the cost of the step motor is relatively high such that the step motor is cost ineffective when the domestic electrical appliance incorporates with the step motor. In other words, most of the domestic electrical appliance will only use the motor, especially the permanent magnet type DC motor.

SUMMARY OF THE PRESENT INVENTION

The invention is advantageous in that it provides a DC motor assembly with step adjusting control arrangement especially for a container, which is adapted to adjustably control the rotational speed of the output shaft of the DC motor in a stepping manner.

Another advantage of the invention is to provide DC motor assembly with step adjusting control arrangement, which is adapted to controllably adjust an angular rotational movement and number of revolution of the output shaft of the DC motor.

Another advantage of the invention is to provide DC motor assembly with step adjusting control arrangement, wherein the output shaft is controllably driven to be rotated and stopped in a sequent manner as a stepping movement to controllably adjust the rotational speed of the output shaft.

Another advantage of the invention is to provide DC motor assembly with step adjusting control arrangement, wherein the output shaft is controllably driven to be rotated and stopped in a sequent manner in responsive to an impulse signal generated by a photocoupler.

Another advantage of the invention is to provide DC motor assembly with step adjusting control arrangement, wherein the impulse signal is generated corresponding to a phase shift of the light transmissible portions and said light blocking portions of the optical grating.

Another advantage of the invention is to provide DC motor assembly with step adjusting control arrangement, wherein the retention time of the output shaft is controllably adjusted to adjustably decelerate the rotational speed of the output shaft.

Another advantage of the invention is to provide DC motor assembly with step adjusting control arrangement, which does not require to alter the original structural and electrical configuration of the DC motorized unit in order to incorporate with the step adjusting control arrangement, so as to minimize the manufacturing cost of the DC motor assembly incorporating with the step adjusting control arrangement.

Another advantage of the invention is to provide DC motor assembly with step adjusting control arrangement, wherein no expensive or complicated structure is required to employ in the present invention in order to achieve the above mentioned objects. Therefore, the present invention successfully provides an economic and efficient solution for controlling the rotational speed of the output shaft of the DC motor in a stepping manner.

Additional advantages and features of the invention will become apparent from the description which follows, and may be realized by means of the instrumentalities and combinations particular point out in the appended claims.

According to the present invention, the foregoing and other objects and advantages are attained by providing a method of controlling a rotational speed of an output shaft of a motorized unit by a DC motor assembly, wherein the method comprises the following steps.

(a) Drive an optical grating to rotate corresponding to a rotational movement of the output shaft, wherein the optical grating has a plurality of light transmissible portions and a plurality of light blocking portions alternating with the light transmissible portions, such that the light transmissible portions and the light blocking portions are phase shifting when the output shaft is start rotating;

(b) Send out an impulse signal by a photocoupler in responsive to a phase shift between the light transmissible portion and the light blocking portion of the optical grating; and (c) Controllably drive the output shaft to be rotated and stopped in a sequent manner as a stepping movement thereof in responsive to the impulse signal so as to controllably adjust the rotational speed of the output shaft.

In accordance with another aspect of the invention, the present invention comprises a DC motor assembly, comprising:

a motorized unit, which is adapted for electrically connecting with a DC power source, comprising an output shaft for generating a rotatable power;

a step adjusting control arrangement, which comprises:

an optical grating, which is operatively coupled at the output shaft, having a plurality of light transmissible portions and a plurality of light blocking portions alternating with the light transmissible portions; and a photocoupler being activated to send out an impulse signal in responsive to a phase shift between the light transmissible portion and the light blocking portion of the optical grating, wherein the output shaft is controllably driven to be rotated and stopped in a sequent manner as a stepping movement thereof in responsive to the impulse signal so as to controllably adjust the rotational speed of the output shaft.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
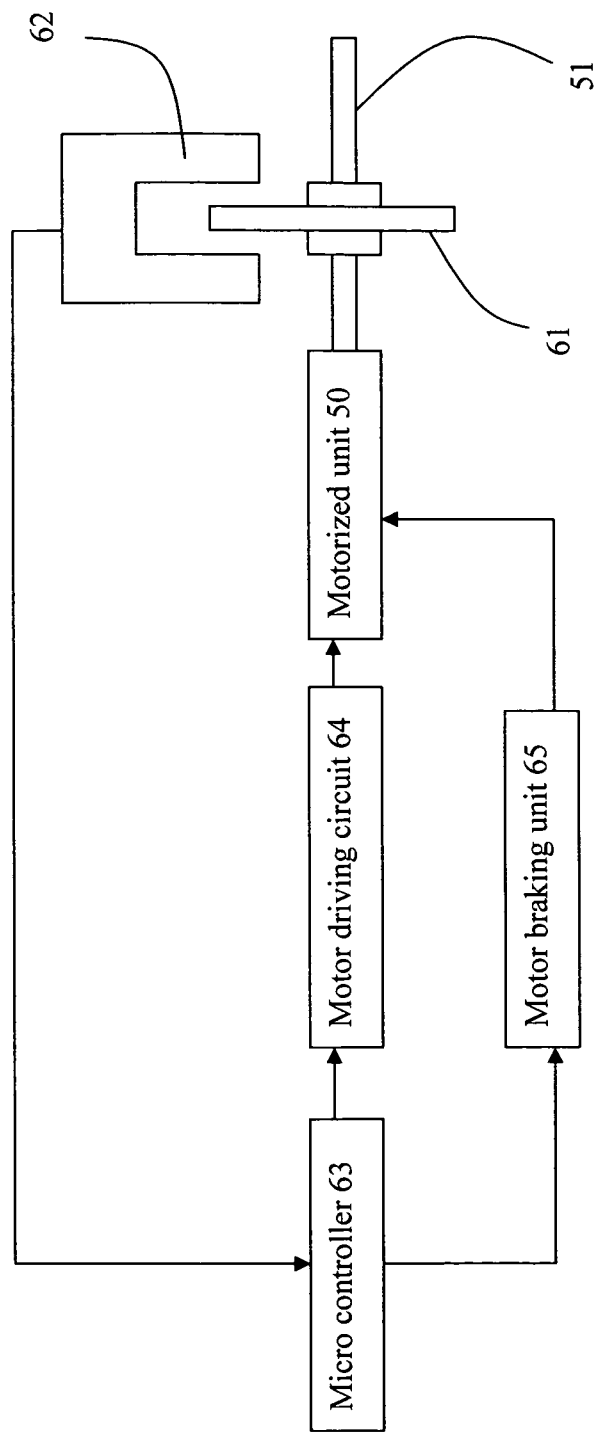
FIG. 1 is a block diagram illustrating the structural configuration of a DC motor assembly according to a preferred embodiment of the present invention.
Figure 2:
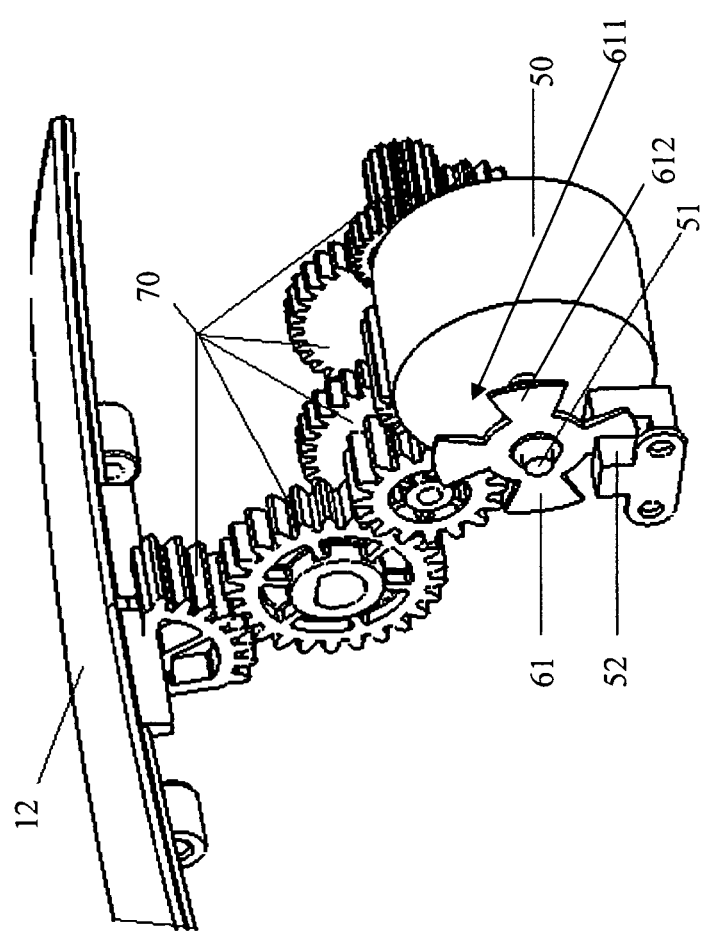
FIG. 2 is a perspective view of the DC motor assembly incorporating with a container according to the above preferred embodiment of the present invention.

Referring to FIGS. 1 and 2 of the drawings, a DC motor assembly according to a preferred embodiment of the present invention is illustrated, wherein the DC motor assembly comprises a motorized unit 50 and a step adjusting control arrangement 60. Accordingly, the DC motor assembly of the present invention is adapted to incorporate with a gear mechanism, such as a container with the gear mechanism.

The motorized unit 50, which is adapted for electrically connecting with a DC power source 30, comprises an output shaft 51 for generating a rotatable power. Accordingly, the motorized unit 50 is a magnetic coil induction type motor, wherein the output shaft 51 is adapted to be selectively driven at a first rotational direction or at a reversed second rotational direction. In other words, when a direct voltage is applied at the motorized unit 50, the output shaft 51 is driven to rotate at a clockwise direction. When an inverse voltage is applied at the motorized unit 50, the output shaft 51 is driven to rotate at a counter-clockwise direction. In particular, the motorized unit 50 is embodied as a permanent magnet type DC motor.

The step adjusting control arrangement 60 comprises an optical grating 61 and a photocoupler 62 to control the rotational power of the output shaft 51 of the motorized unit 50.

Figure 4:
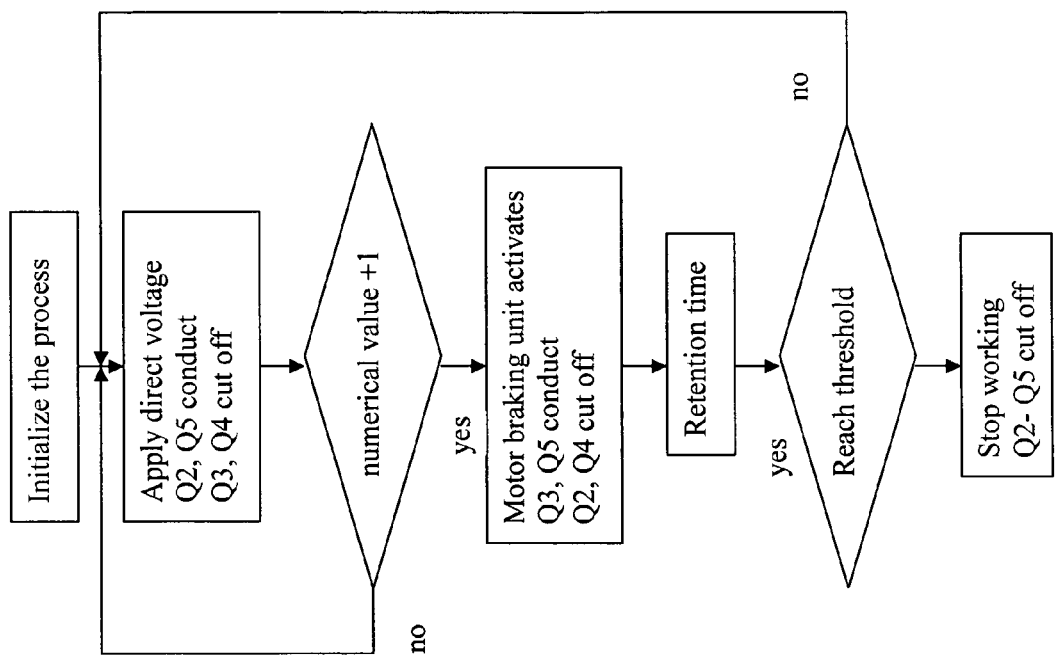
FIG. 4 is a flow diagram illustrating a method of controlling a rotational speed of an output shaft of a motorized unit by the DC motor assembly according to the above preferred embodiment of the present invention.

The present invention further comprises a method of controlling the rotational speed of the output shaft 51 of a motorized unit 50 by the DC motor assembly as shown in FIG. 4, wherein the method comprises the following steps.

(1) Drive an optical grating 61 to rotate corresponding to a rotational movement of the output shaft 51, wherein the light transmissible portions 611 of the optical grating 61 are alternating with the light blocking portions 612, such that the light transmissible portions 611 and the light blocking portions 612 are phase shifting when the output shaft 51 is start rotating.

(2) Send out the impulse signal by the photocoupler 62 in responsive to a phase shift between the light transmissible portion 611 and the light blocking portion 612 of the optical grating 61.

(3) Controllably drive the output shaft 51 to be rotated and stopped in a sequent manner as a stepping movement thereof in responsive to the impulse signal so as to controllably adjust the rotational speed of the output shaft 51.

According to the preferred embodiment, the optical grating 61 is operatively coupled at the output shaft 51, wherein the optical grating 61 has a plurality of light transmissible portions 611 and a plurality of light blocking portions 612 alternating with the light transmissible portions 611.

The photocoupler 62 is activated to send out an impulse signal in responsive to a phase shift between the light transmissible portion 611 and the light blocking portion 612 of the optical grating 61, wherein the rotational speed, an angular movement and number of revolution of the output shaft 51 are controllably adjusted in responsive to the impulse signal of the photocoupler 62.

Accordingly, the optical grating 61 is coaxially coupled at the output shaft 51, wherein the optical grating 61 is driven to rotate corresponding to a rotational movement of the output shaft 51. In other words, the rotational movement of the optical grating 61 is synchronized with the rotational movement of the output shaft 51.

In particular, the optical grating 61 has a thin circular disk shape that the light transmissible portions 611 and the light blocking portions 612 of the optical grating 61 are radially and evenly formed to communicate with the photocoupler 62, as shown in FIG. 2. Preferably, the optical grating 61 has a center portion coaxially coupled at the output shaft 51 and a plurality of extending portions radially extended from the center portion to define the light blocking portions 612 at the extending portions respectively, wherein each of the light transmissible portions 611 is defined at a gap between two adjacent extending portions.

Accordingly, the light transmission path of the photocoupler 62 can pass through each of the light transmissible portions 611 of the optical grating 61 while the light transmission path of the photocoupler 62 is blocked by each of the light blocking portions 612 of the optical grating 61.

The photocoupler 62 comprises a light transmitter, such as an infrared transmitter and a light receiver, such as an infrared receiver, wherein the infrared transmitter is embodied as an infrared transmitting diode and the infrared receiver is embodied as an infrared receiving triode. In other words, the light transmission path is transmitted from the light transmitter to the light receiver through the optical grating 61.

The step adjusting control arrangement 60 further comprises a micro controller 63 operatively linked to an output terminal of the photocoupler 62. Accordingly, the photocoupler 62 is arranged to send out the impulse signal to the micro controller 63 at each phase location of the light transmissible portions 611 and the light blocking portions 612 of the optical grating 61. Therefore, the micro controller 63 will determine the angular movement and number of revolution of the output shaft 51 in responsive to the phase shift of the light transmissible portions 611 and the light blocking portions 612 of the optical grating 61.

The step adjusting control arrangement 60 further comprises a motor driving circuit 64 operatively linked between the micro controller 63 and the motorized unit 50, wherein an input terminal of the motor driving circuit 64 is operatively linked to the terminal of the micro controller 63 while an output terminal of the motor driving circuit 64 is operatively linked to the motorized unit 50. Accordingly, the motor driving circuit 64 is arranged to control the motorized unit 50 in an on-and-off manner, wherein when the motor driving circuit 64 applies a direct voltage at the motorized unit 50, the output shaft 51 is driven to rotate.

Accordingly, the step adjusting control arrangement 60 further comprises a motor braking unit 65 operatively linked to the motorized unit 50 to immediately stop the inertia rotational movement of the output shaft 51. The motor braking unit 65 is embodied as a circuit configured with diodes, transistors, and resistors. The motor braking unit 65 is arranged to cut off the DC power the motorized unit 50 at its two terminals from the DC power source 30. When the power of the motorized unit 50 is cut off, the output shaft 51 will keep rotating by the inertia of the load at the output shaft 51 and the rotor of the motorized unit 50. Therefore, the motorized unit 50 will not be shut off immediately, at the mean time, the motorized unit 50 will become the generator according to the electromagnetic theory. Once the power of the motorized unit 50 is cut off, the motor braking unit 65 will apply a current passing through the coil inside the motorized unit 50 to cut off the line of magnetic field so as to generate a resistance force to instantly stop the rotatable power from the motorized unit 50. In other words, the motor braking unit 65 will apply the inverse voltage to the motorized unit 50 to immediately stop the inertia rotational movement of the output shaft 51 when the output shaft 51 is rotating.

Accordingly, the step (3) of the present invention further comprises the following steps.

(3.1) Apply a direct voltage to the motorized unit 50 via the motor driving circuit 64 to drive the output shaft 51 to rotate.

(3.2) Apply an inverse voltage to the motorized unit 50 via the motor braking unit 65 to immediately stop the rotational movement of the output shaft 51 so as to provide the stepping movement of the output shaft 51.

Accordingly, the output terminal of the micro controller 63 is operatively linked to the motor driving circuit 64 such that when the micro controller 63 is controlled to activate the motor driving circuit 64, the motor driving circuit 64 will apply a predetermined voltage at the two terminals of the motorized unit 50, so as to actuate the motorized unit 50 for generating the rotatable power at the output shaft 51. The optical grating 61 is driven to rotate correspondingly by the output shaft 51 to shift the alternating positions of the light transmissible portions 611 and the light blocking portions 612 of the optical grating 61. The photocoupler 62 will send out the impulse signal to the micro controller 63 at each phase location of the light transmissible portions 611 and the light blocking portions 612 of the optical grating 61. In responsive to the impulse signal, the output terminal of the micro controller 63 will correspondingly adjust the output signal to the motor driving circuit 64 so as to stop applying the voltage at the two terminals of the motorized unit 50. At the mean time, the motor braking unit 65 is activated to apply the current to the terminals of the motorized unit 50 to immediately stop the rotatable power from the motorized unit 50. Therefore, the output shaft 51 of the motorized unit 50 is stopped rotating for a predetermined retention time. Once the photocoupler 62 sends out the impulse signal to the micro controller 63 at next phase location of the light transmissible portions 611 and the light blocking portions 612 of the optical grating 61, the micro controller 63 will activate the motor driving circuit 64 to drive the motorized unit 50 for generating the rotatable power again. By repeating the above steps, the output shaft 51 will be controlled to rotate and stop in a sequent manner as a stepping movement. In other words, by controlling the retention time of the output shaft 51, the rotational speed of the output shaft 51 can be selectively controlled. In particular, the retention time is controllably adjusted to adjustably decelerate the rotational speed of the output shaft 51.

It is worth mentioning that the micro controller 63 can determine and control the retention time of the output shaft 51 in responsive to the phase location of the light transmissible portions 611 and the light blocking portions 612 of the optical grating 61, so as to control and adjust the angular movement and number of revolution of the output shaft 51. Therefore, the traveling distance of the load through the output shaft 51 can be controllably adjusted.

Figure 3:
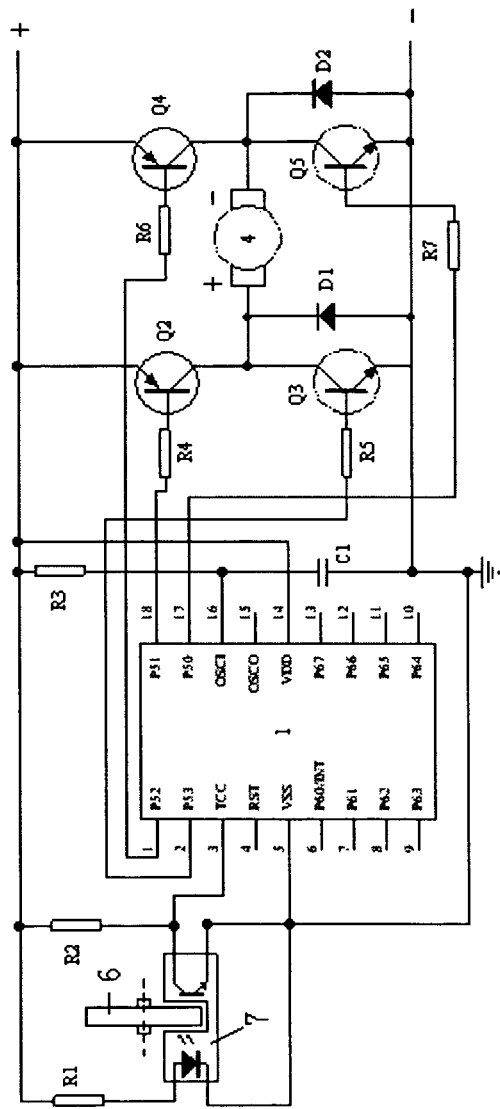
FIG. 3 is a circuit diagram illustrating the circuit configuration of the DC motor assembly incorporating with a container according to the above preferred embodiment of the present invention.

As shown in FIG. 3, the motor driving circuit 64 is a circuit configured by a plurality of triodes Q2, Q3, Q4, Q5, and resistors R4, R5, R6, R7. The motor braking unit 65 is a circuit configured by two diodes D1, D2, two triodes Q3, Q4, and resistors R5, R7. The micro controller 63 has a plurality of terminals 1, 2, 17, 18 operatively linked to the triodes Q2, Q3, Q4, Q5 through the resistors R4, R5, R6, R7 respectively. When the terminals 1, 17 of the micro controller 63 are set at a relatively high electric level while the terminals 2, 18 of the micro controller 63 are set at a relatively low electric level, the triodes Q2, Q5 are electrically conducted and the triodes Q3, Q4 are electrically cut off. Therefore, a voltage with forward direction is applied to the motorized unit 50, wherein the output shaft 51 is driven to rotate at a clockwise direction. Likewise, when the terminals 1, 17 of the micro controller 63 are set at a relatively low electric level while the terminals 2, 18 of the micro controller 63 are set at a relatively high electric level, the triodes Q2, Q5 are electrically cut off and the triodes Q3, Q4 are electrically conducted. Therefore, a voltage with reversed direction (inverse voltage) is applied to the motorized unit 50, wherein the output shaft 51 is driven to rotate at a counter-clockwise direction.

The output terminal of the photocoupler 62 is electrically coupled at the terminal 3 of the micro controller 63 which is one of the input terminals thereof. When the light transmission path between the infrared transmitter and the infrared receiver of the photocoupler 62 is blocked by the light blocking portion 612 of the optical grating 61, the terminal 3 of the micro controller 63 is set at a relatively high electric level. When the light transmission path passes between the infrared transmitter and the infrared receiver of the photocoupler 62 through the light transmissible portion 611 of the optical grating 61, the terminal 3 of the micro controller 63 is set at a relatively low electric level. Preferably, there are four light blocking portions 612 provided at the optical grating 61. Therefore, the micro controller 63 will generate four corresponding impulse signals at the terminal 3 for each revolution of the output shaft 51. In other words, the angular step angle of the motorized unit 50 is 90°.

Figure 5:
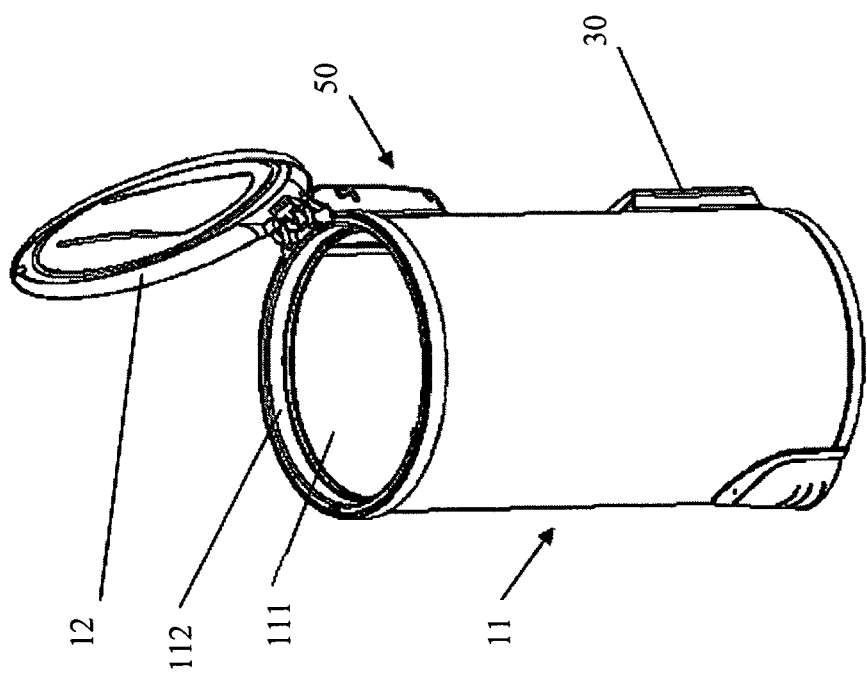
FIG. 5 illustrates the DC motor assembly incorporating with the container according to the above preferred embodiment of the present invention.

As shown in FIG. 5, the DC motor assembly can be incorporated with a container, such as a trash container, as one of the applications of the present invention, as shown in FIG. 3. The container generally comprises a container body 11 having a storage cavity 111 and a container opening 112 communicating with the storage cavity 111, a foldable cover 12, and an actuation unit to move the foldable cover 12 between an opened position and a closed position. The actuation unit generally comprises a gear unit 70 coupling between the folding joint of the foldable cover 12 and the DC motor assembly of the present invention. Preferably, the gear unit 70 is a decelerating gear set to transmit an input rotatable force with high speed and low torque power from the DC motor assembly to an output rotatable force with low speed and high torque power to the folding joint 13 of the foldable cover 12. In other words, the gear unit 70 is a force transmitting unit for transmitting the rotatable power of the DC motor assembly to the foldable cover 12 so as to move the foldable cover 12 between the opened and closed position. It is worth mentioning that the output rotatable force with low speed and high torque power is a decelerating and torque enhancing force to move the foldable cover 12 to the closed position in a hydraulic manner so as to minimize the unwanted noise generated when the foldable cover 12 directly impacts to the container body 11 at the closed position.

In particular, the motorized unit 11 comprises two output shafts 11 extending oppositely and being driven to rotate at the same speed and direction in a synchronized manner, wherein one of the output shafts 11 is coupled with the optical grating 61 to drive the optical grating 61 correspondingly, while another output shaft 51 is coupled with the gear unit 70.

When the foldable cover 12 is moved to its closed position, the motorized unit 50 will be controlled to generate the rotatable power at the output shaft 51 with relatively low speed manner, such that the output shaft 51 will be driven to rotate slowly. At the mean time, the micro controller 63 will determine the traveling distance of the foldable cover 12. At the initiate state, the terminals 1, 19 of the micro controller 63 are set at relatively high electric level while the terminals 2, 17 of the micro controller 63 are set at relatively low electric level, wherein the triodes Q2, Q3, Q4, Q5 are all cut off. Therefore, the electrical power of the motorized unit 50 is cut off to remain at an idle condition. After the initiate state, the micro controller 63 modifies its state that the terminals 1, 17 of the micro controller 63 are set at relatively high electric level while the terminals 2, 18 of the micro controller 63 are set at relatively low electric level, i.e. applying the voltage at forward direction (direct voltage), wherein the triodes Q2, Q5 are electrically conducted while the triodes Q3, Q4 are electrically cut off. Therefore, the output shaft 51 is driven to start rotating at a clockwise direction to start moving the foldable cover 12 from the opened position to the closed position. At the same time, the optical grating 61 is driven to rotate corresponding to the output shaft 51. When the optical grating 61 is rotated at 90°, the photocoupler 62 will send the impulse signal to the micro controller 63, wherein the micro controller 63 will digitize the impulse signal, for example by adding 1 value into a unity, in order to modify the output of the micro controller 63.

In particular, the impulse signals are configured as numerical values that when the numerical values reach a preset threshold, the output shaft 51 is completely stopped rotating, and when the numerical values is below the preset threshold, the output shaft 51 repeatedly controlled to be rotated and stopped in a sequent manner until the numerical values reach the preset threshold. In other words, the numerical values will add 1 for each impulse signal unit the numerical values reach the preset threshold Accordingly, the output of the micro controller 63 is modified that the terminals 1, 2, 18, 17 of the micro controller 63 are set at relatively high electric level. Therefore, the triodes Q2, Q3, Q4, Q5 are all electrically cut off. Then, the motor braking unit 65 is activated to immediately stop the rotational movement of the output shaft 51. The output shaft 51 is controlled to stop its rotational movement for the predetermined retention time. After the retention time, the micro controller 63 will determine the value reaching the preset threshold, i.e. the traveling distance of the foldable cover 12 reaching at the closed position. When the value reaches the preset threshold, i.e. the foldable cover 12 is already moved at the closed position, the motorized unit 50 is stopped working. When the value does not reach the preset threshold, i.e. the foldable cover 12 has not been moved at the closed position, the micro controller 63 will repeat the steps to modify the output thereof until the value reaches the preset threshold. It is worth mentioning that by controllably adjusting the retention time, the rotational speed of the output shaft 51 will be correspondingly adjusted to decelerate the movement of the foldable cover 12 from the opened position to the closed position. Preferably, the output shaft 51 of the motorized unit 50 is stopped rotating at every 90° rotating angle. In addition, through the gear unit 70, the output rotatable force at the output shaft 51 is further decelerated to further reduce the speed of the foldable cover 12 from the opened position to the closed position. Therefore, the foldable cover 12 will be moved to the closed position in a hydraulic manner. It is appreciated that the angular stepping movement of the output shaft 51 can be reduced by increasing the number of the light blocking portions 612 of the optical grating 61. In addition, the optical grating 61 can be supported by one gear of the gear unit 70, wherein when the gear is driven to rotate by the output shaft 51, the optical grating 61 at the corresponding gear is driven to rotate in responsive to the output shaft 51 for communicating with the photocoupler 62, so as to controllably adjust the angular movement and number of revolution of the output shaft 51.

It is appreciated that the DC motor assembly of the present invention can be incorporated with container such as trash container, to control the folding movement of the foldable cover by controllably adjusting the rotational speed of the output shaft 51 of the motorized unit 50. In addition, the motorized unit 50 can be a permanent magnet induction coil type motor in order to minimize the manufacturing cost of the container incorporating with the DC motor assembly.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of controlling a rotational speed of an output shaft of a motorized unit by a DC motor assembly, comprising the steps of:

(a) driving an optical grating to rotate corresponding to a rotational movement of said output shaft, wherein said optical grating has a plurality of light transmissible portions and a plurality of light blocking portions alternating with said light transmissible portions, such that said light transmissible portions and said light blocking portions are phase shifting when said output shaft is start rotating;

(b) sending out an impulse signal by a photocoupler in responsive to a phase shift between said light transmissible portion and said light blocking portion of said optical grating;

(c) controllably driving said output shaft to be rotated and stopped in a sequent manner as a stepping movement thereof in responsive to said impulse signal so as to controllably adjust said rotational speed of said output shaft; and (d) controllably adjusting an angular rotational movement and number of revolution of said output shaft in responsive to said impulse signal, wherein the step (d) further comprises a step of configuring said impulse signals as numerical values that when said numerical values reach a preset threshold, said output shaft is completely stopped rotating, and when said numerical values is below said preset threshold, said output shaft repeatedly controlled to be rotated and stopped in a sequent manner until said numerical values reach said preset threshold.

2. The method, as claimed in claim 1, wherein the step (c) further comprises the steps of: (c.1) applying a direct voltage to said motorized unit to drive said output shaft to rotate; and (c.2) applying an inverse voltage to said motorized unit to immediately stop said rotational movement of said output shaft so as to provide said stepping movement of said output shaft, wherein, in the step (c), said output shaft is stopped after rotation for a predetermined retention time, wherein said retention time is controllably adjusted to adjustably decelerate said rotational speed of said output shaft.

3. The method, as recited in claim 2, wherein the step (a) further comprises a step of coaxially coupling said optical grating at said output shaft to drive said optical grating to rotate correspondingly so as to phase shift said light transmissible portions and said light blocking portions of said optical grating in an alternating manner.

4. A DC motor assembly, comprising:
  a motorized unit, which is adapted for electrically connecting with a DC power source, comprising an output shaft for generating a rotatable power; and
  a step adjusting control arrangement, which comprises:
    an optical grating, which is operatively coupled at said output shaft, having a plurality of light transmissible portions and a plurality of light blocking portions alternating with said light transmissible portions;
    a photocoupler being activated to send out an impulse signal in responsive to a phase shift between said light transmissible portion and said light blocking portion of said optical grating, wherein said output shaft is controllably driven to be rotated and stopped in a sequent manner as a stepping movement thereof in responsive to said impulse signal so as to controllably adjust said rotational speed of said output shaft; and
    a motor braking unit operatively linked to said motorized unit for applying an inverse voltage at said motorized unit to immediately stop an inertia rotational movement of said output shaft while said output shaft is rotating.

5. The DC motor assembly, as recited in claim 4, wherein said optical grating is coaxially coupled at said output shaft such that said optical grating is driven to rotate corresponding to said rotational movement of said output shaft, wherein said optical grating has a circular disk shape that said light transmissible portions and said light blocking portions of said optical grating are radially and evenly formed to communicate with said photocoupler.

6. The DC motor assembly, as recited in claim 5, wherein said step adjusting control arrangement further comprises a micro controller operatively linked between said photocoupler and said motorized unit to receive said impulse signal so as to selectively control said output shaft being rotated and stopped in a sequent manner.

* * * * *